United States Patent [19]

Leonard

[11] Patent Number: 5,006,094
[45] Date of Patent: Apr. 9, 1991

[54] SELF-POSITIONING BELT TENSIONER

[75] Inventor: George H. Leonard, Darien, Conn.

[73] Assignee: Hamlin Transmission Corporation, Wilton, Conn.

[21] Appl. No.: 552,295

[22] Filed: Jul. 13, 1990

Related U.S. Application Data

[63] Continuation-in-part of Ser. No. 403,571, Sep. 6, 1989, Pat. No. 4,946,426.

[51] Int. Cl.$^5$ .................. F16H 7/08; F16H 55/54
[52] U.S. Cl. ....................... 474/101; 474/49
[58] Field of Search ............ 474/49, 50, 52–56, 474/101, 111, 113–117, 136, 137, 140, 138

[56] References Cited

U.S. PATENT DOCUMENTS

| | | | |
|---|---|---|---|
| 4,030,373 | 6/1977 | Leonard | 474/49 X |
| 4,530,676 | 7/1985 | Leonard | 474/49 |
| 4,810,236 | 3/1989 | Kumm | 474/101 |
| 4,816,008 | 3/1989 | Leonard | 474/49 |
| 4,820,244 | 4/1989 | Lander | 474/56 |
| 4,832,660 | 5/1989 | Leonard | 474/49 |
| 4,946,426 | 8/1990 | Leonard | 474/101 |

Primary Examiner—Thuy M. Bui
Attorney, Agent, or Firm—Perman & Green

[57] ABSTRACT

A self adjusting tensioning system for a variable transmission. An endless belt is advanced by and supported on a pair of spaced apart, variable diameter, sheaves which are independently movable between reduced and enlarged configurations and which result in the belt assuming different paths. A pair of rollers are rotatably mounted at fixedly spaced locations on an elongated carrier member. One of the rollers is actively biased into engagement with the belt by a compression spring assembly. A cam surface on the carrier member proximate the other of the rollers is slidable along a fixed contoured supporting surface and passively assures engagement of the other of the rollers with the belt. As the ratio of the transmission changes with changed diameters of the sheaves and the belt thereby assumes a changed path, the belt is effective to automatically move the rollers therealong so as to maintain a substantially constant tension in the belt. A stabilizer mechanism inhibits undesirable rotational movement of the carrier member about its longitudinal axis.

15 Claims, 11 Drawing Sheets

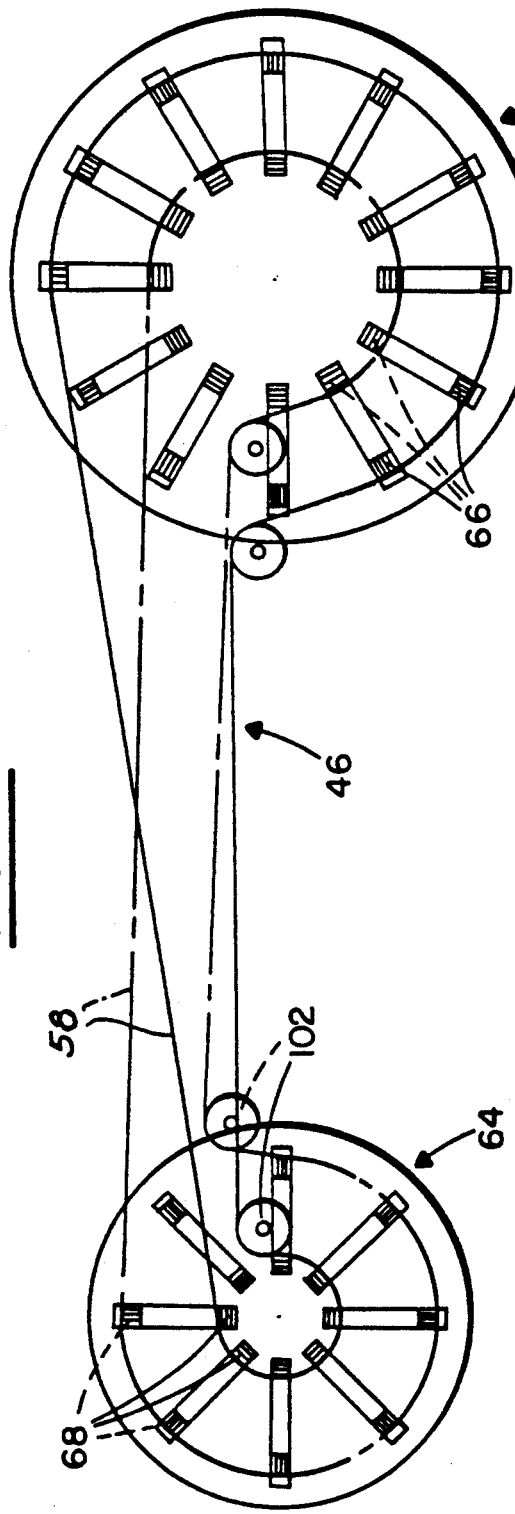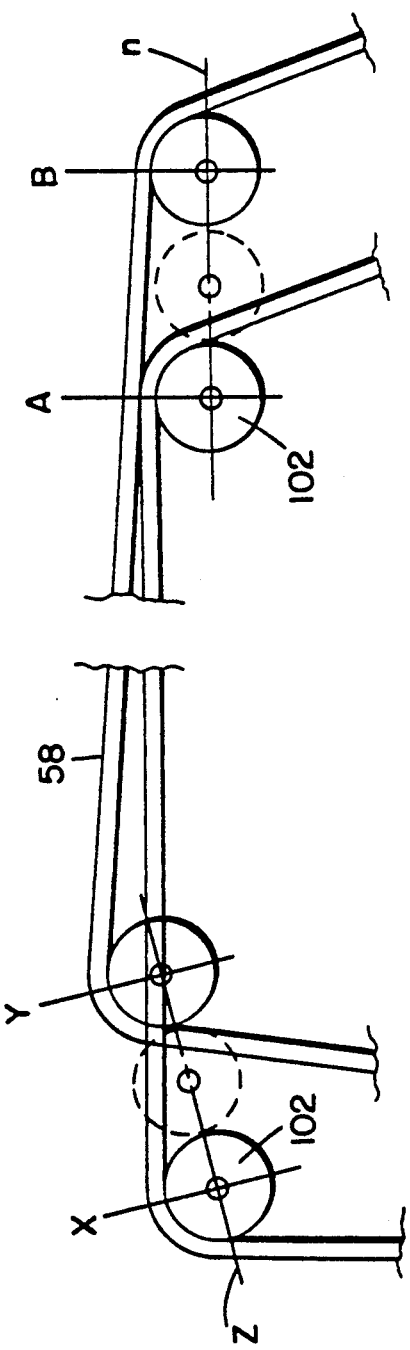

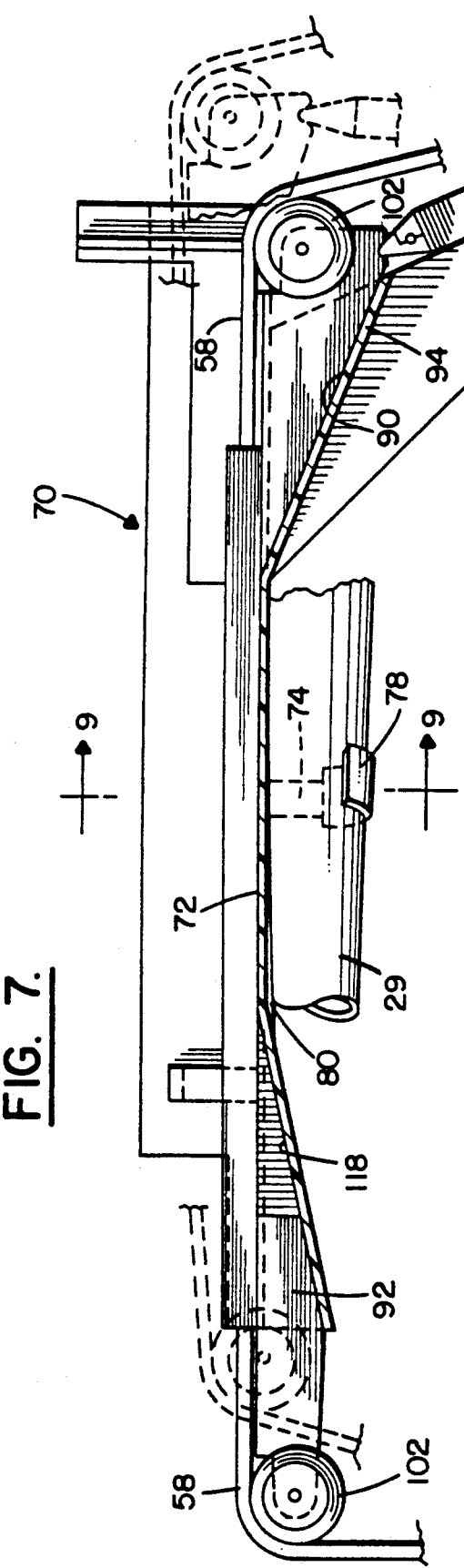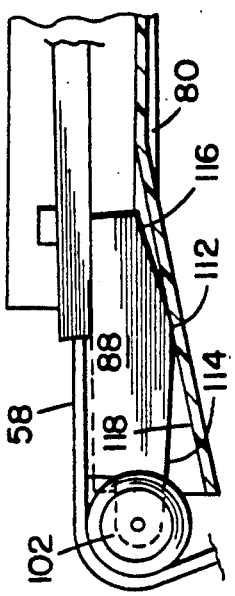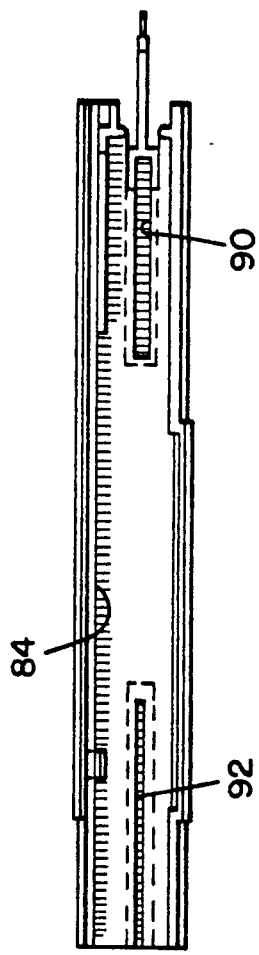

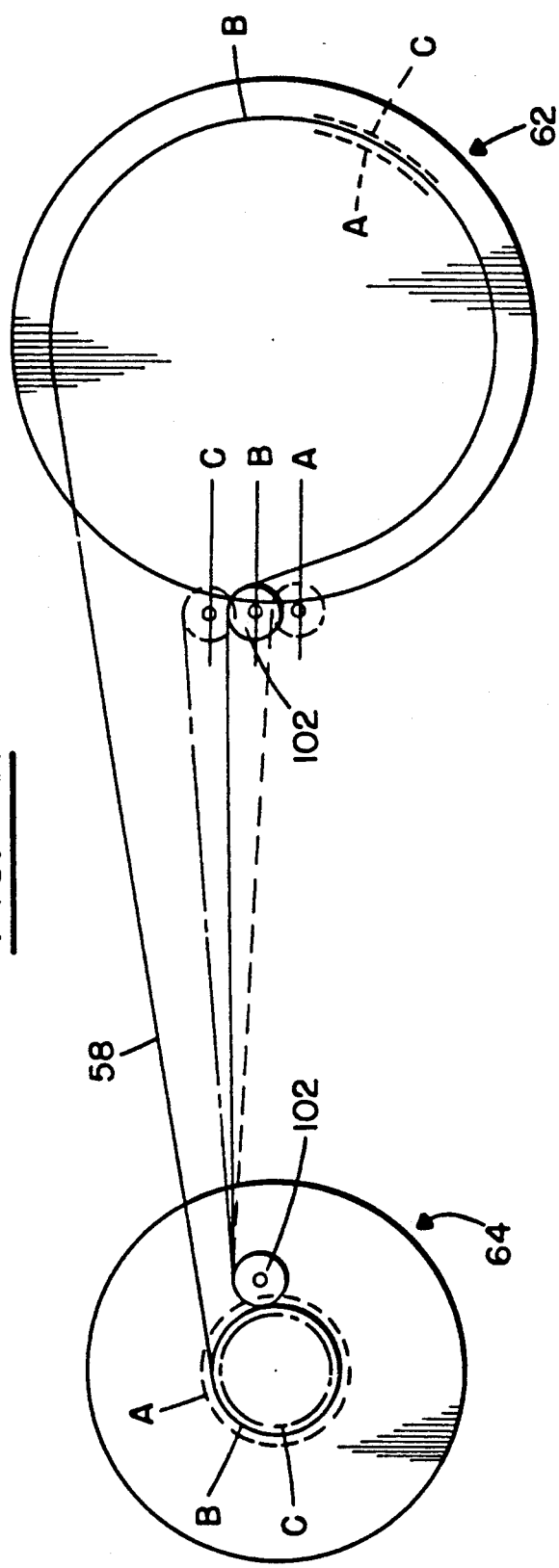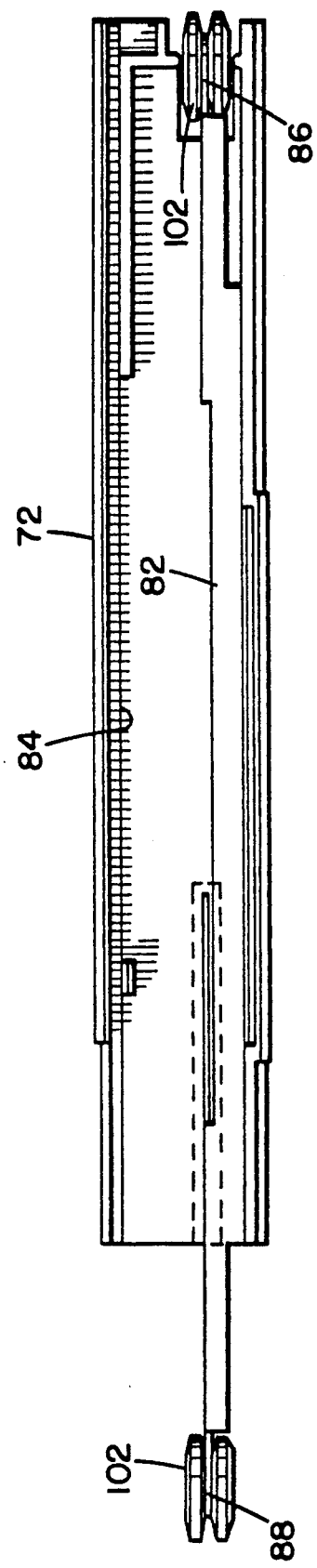

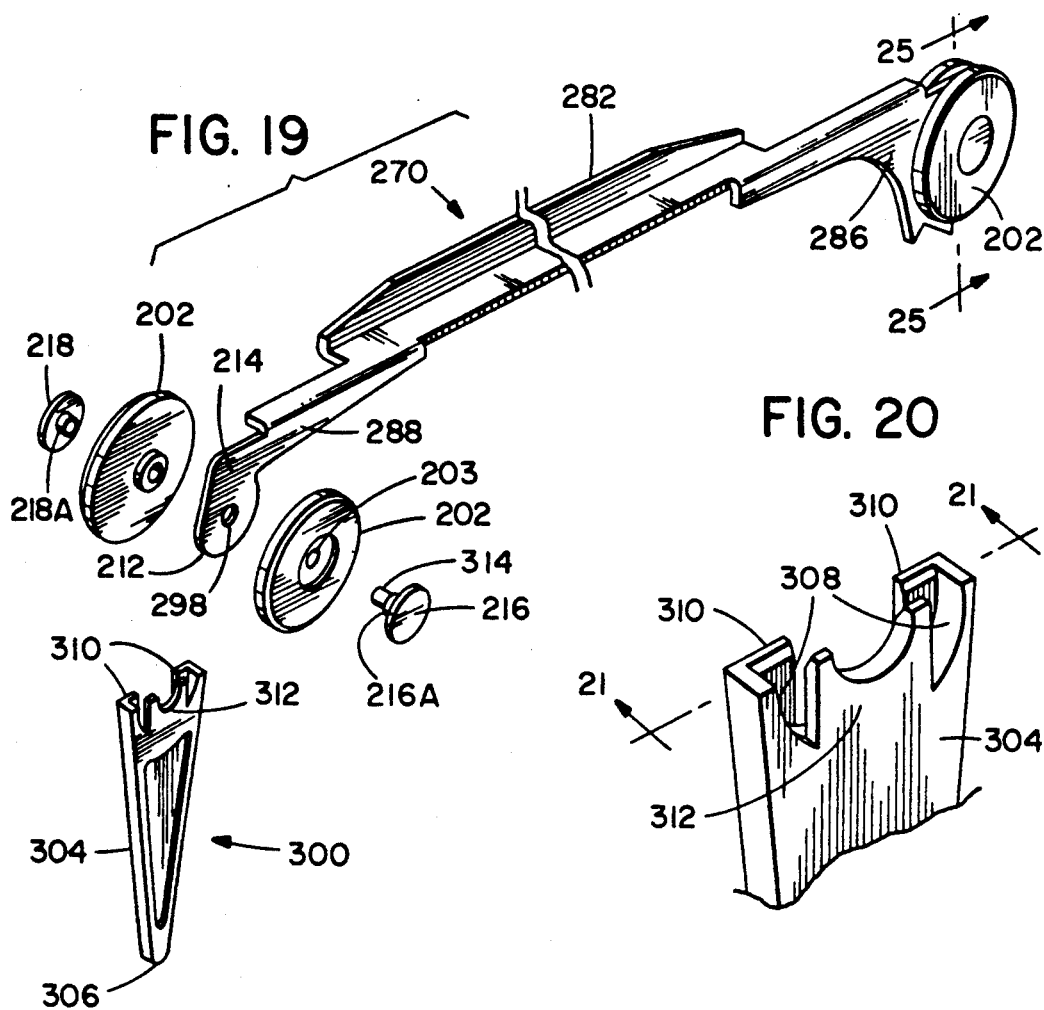
FIG. 19
FIG. 20
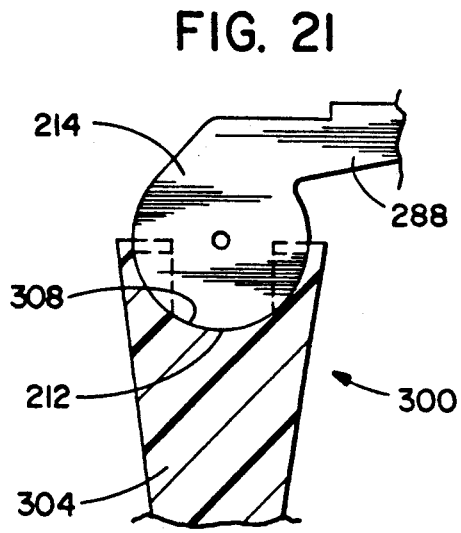
FIG. 21
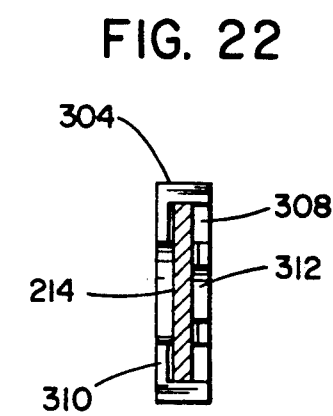
FIG. 22

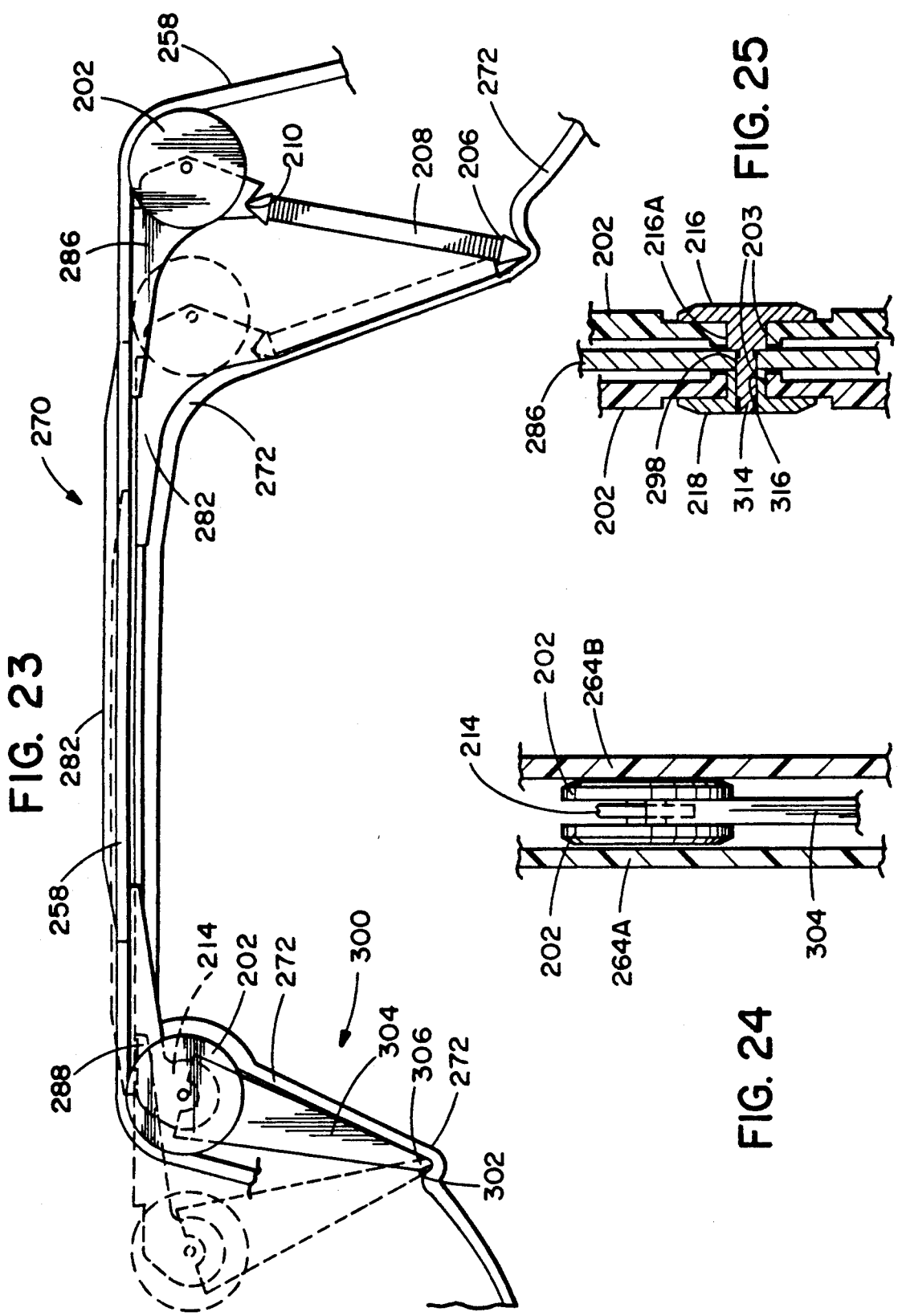

SELF-POSITIONING BELT TENSIONER

BACKGROUND OF THE INVENTION

A. RELATED APPLICATIONS

This is a continuation-in-part of Application Ser. No. 07/403,571 filed Sept. 6, 1989, now U.S. Pat. No. 4,946,426, issued Aug. 7, 1990. Reference is also hereby made to my copending application Ser. No. 07/403,571, filed Sept. 6, 1989, entitled "Spring Assembly" which is fully incorporated herein.

B. FIELD OF THE INVENTION

The present invention relates to variable ratio transmissions or drive systems generally utilizing a drive belt and, more particularly, to a mechanism for maintaining a substantially, constant, though minimized, tension on the drive belt. The invention has particular application to bicycles and is generally related in this context in the present disclosure. Nonetheless, such presentation must be understood as being exemplary of the invention and not limiting, since its principles may be applied in a host of other environments.

C. DESCRIPTION OF THE PRIOR ART

Bicycles equipped with chain-driven multi-speed transmissions called "derailleurs" have become popular world-wide. Derailleurs enable the bicycle rider to select various "speeds" for various slopes of the road and to accommodate the different needs of vigorous and weaker riders. A selected "speed" of a bicycle transmission identifies the ratio of the number of turns of the pedal crank to the resulting number of turns of the driven rear wheel.

A vigorous rider will choose a high speed or transmission ratio for riding down-hill or along a level road so that pedaling at a reasonable rate causes the bicycle to travel rapidly, and the same rider will choose a different ratio, a low speed, when riding slowly up-hill or on a poor road such as gravel.

Derailleurs with ten speeds are most common. However, derailleurs having more than ten speeds have become more and more common because they provide additional choices between the speeds of the ten speed transmission but have significant drawbacks including increased cost, weight and troublesome complexity.

A derailleur is inherently heavy due to its chain and many gears which are of metal, whereas bicycle riders have a high regard for lightweight bicycles Also, derailleurs lack an indicator to tell the rider which speed or ratio has been selected. Furthermore, most derailleurs lack a housing so that the mechanism is exposed to rain, abrasive dirt, and other contaminants, leading to rust, wear and other damage. Finally, when a bicycle is equipped with a derailleur, it is difficult and cumbersome to remove and reassemble the rear wheel of the bicycle for replacing or repairing the tire. It is equally difficult to remove the whole transmission for replacement.

An alternative type of variable ratio transmission for bicycles is disclosed in U.S. Pat. Nos. 4,030,373 and 4,530,676 in which I am the inventor Both of these patents are incorporated herein by reference. That type of transmission includes a pair of adjustable sheaves coupled to each other by a belt. The present invention involves a novel transmission of that type.

In U.S. Pat. No. 4,030,373, a set of sheave segments are continuously adjustable radially on each of the two sheaves, so that fine locking teeth are required to maintain any adjustment. In the transmission in U.S. Pat. No. 4,530,676, each of the sheaves also has a set of sheave segments that are adjustable. As an improvement over the '373 patent, the adjustments in '676 differ by discrete increments. A large number of discrete transmission ratios can be provided and relatively large locking teeth are used which are capable of withstanding much greater forces imposed on the sheave segments by the belt than in the '373 patent. Either of the sheaves in '676 can be used as the driving sheave in general applications of the transmission.

In any such transmission utilizing a belt, a continuous goal of the design is to maintain a substantially constant, albeit minimal, tension in the belt. Excessive tension occurring in the belt, even momentary as during shifting of the drive ratios, should be avoided. Various attempts have been made by me in seeking this goal. In the '373 patent, for example, I disclosed a construction in which the belt engages a pair of spaced idlers, one being fixed and the other being movable and biased against the belt. In the '676 patent, a somewhat different construction is disclosed in which a spaced pair of guide rollers are rotatably mounted on the respective ends of resilient arms The guide rollers engage the drive belt and the resilient arms are free to pivot in the plane of the drive belt about an axis perpendicular to the plane of the drive belt.

A further transmission development of mine is presented in U.S. Pat. No. 4,816,008 and, in its offspring, application Ser. No. 140,232. Now Pat.No. 4,816,008. Among the unique concepts disclosed in these disclosures is a belt tensioner according to which a pair of independently mounted and movable guide rollers are employed to engage the drive belt. These disclosures are also incorporated herein by reference.

Commonly assigned Pat. Nos. 4,820,244 and 4,832,660 disclose even further transmission developments, particularly relating to the construction of the sheaves which enable a variable ratio output, and are also incorporated herein by reference.

The present invention may be used in combination with the novel, improved transmission of the type mentioned above that includes two sheaves coupled to each other by a drive belt. In its broad aspect, the novel transmission is useful for widely varied purposes but certain attributes and added features render the transmission particularly useful in bicycles. In certain aspects of the invention, the novel transmission is an integral part of a bicycle.

The variable ratio drive mechanism has a drive sheave mechanism, a driven sheave mechanism, and an endless member or drive belt which drivingly couples the sheave mechanisms to each other. At least one of the sheave mechanisms includes a set of sheave segments, each sheave segment having a bearing surface engageable by the drive belt and means for placing and securing the sheave segments to said one sheave mechanisms in any of a series of positions distributed on said one sheave mechanism so that the bearing surfaces can be selectively positioned at a series of concentric circles. The drive belt applies pressure to all of-the sheave segments except those in an adjustment zone of said one sheave mechanism where the drive belt is disengaged from the sheave segments. There is also provided gate means in the adjustment zone of said one sheave mechanism for adjusting the sheave segments to a selected position.

The gate adjustment means of the mechanism may have a control means and actuating means and the drive means to operate the mechanism may be in the same means to effect displacement of the gate to discrete positions. The mechanism may have two drive belt positioning means, one of which can be a force or tension applying means, adjacent the sheave mechanism for positioning the endless member to maintain wrap, and in some instances maximum wrap, of the endless member around the sheave mechanism, the drive belt positioning means being independently supported for movement. The mechanism may have locking rail means adjacent the sheave segments which are operated between released and locked conditions to adjust the positions of the sheave segments. The mechanism may also have a one-way clutch between the driven sheave means and the output thereof, such as the rear wheel of a bicycle, to provide easy decoupling of the output from the driven sheave means. The mechanism, which is easily and quickly removable from its frame such as a bicycle frame for replacement, intact, may also be made in a modular manner to be adaptable to frames of varying sizes.

It is eminently practical to provide a great many speeds, 21 speeds being provided in the example described in Pat. No. 4,816,008 in detail as compared to 10 speeds of a widely used derailleur. Molded plastic parts may be used almost exclusively so that the cost and weight of the transmission are comparatively low. The entire mechanism is designed such that it can readily be enclosed in a housing for protection against rain, dirt and other contaminants. This is in contrast to derailleurs wherein it is impractical to provide a housing and where exposure of the mechanism leads to rusting and premature wear of its parts.

The novel transmission can be equipped with an indicator to show the rider (or the user, in other applications of the transmission) which transmission ratio has been selected. In contrast, it is impractical to provide a unitary speed indicator in usual derailleurs.

In a bicycle equipped with the novel transmission with which the invention is utilized, the removal and reassembly of the rear wheel for repairing or replacing its tire is a simple matter. A one-way driving clutch between the ratio-changing mechanism and the rear wheel includes a driving clutch unit fixed to the belt driven sheave and a driven clutch unit fixed to the bicycle's rear wheel. The driven clutch unit and the rear wheel form an assembly that is removable from the bicycle as one part. When the rear wheel is removed, the driven clutch unit simple separates harmlessly from the driving clutch unit. The driving and driven units of the clutch become coupled to each other automatically when the rear wheel is reassembled to the bicycle. This is in contrast to a much more complicated procedure for removing the rear wheel of bicycles equipped with derailleurs.

In general applications of the transmission, either sheave can be used as the driving sheave. Moreover, the direction of rotation of the driving sheave can be reversed for special purposes when only a small amount of torque is required. When a bicycle is equipped with the novel transmission, its useful torque, when operated in reverse, enables the rider to change the transmission ratio by pedalling forward or backward, for example while coasting on a level road toward an uphill slope. A stabilizer mechanism may be provided to counteract undersirable rotational movement of the carrier member about its longitudinal axis. This mechanism further assures that the rollers are fully, squarely, engaged with the drive belt at all times.

In transmissions having two belt-coupled sheaves, the belt includes a driving length that extends from one sheave to the other; the belt is wrapped part way around each sheave; and a return length of the belt completes the loop. Up to now, however, it has been difficult to assure that undesirable slack of the return length, or course, of the belt is taken up and that tension in the belt is maintained substantially constant throughout the shifting process.

It was in light of the foregoing that the present invention has been conceived and is now reduced to practice.

SUMMARY OF THE INVENTION

Accordingly, the present invention is directed toward a self-adjusting tensioning system for a variable transmission. To this end, an endless drive belt is advanced by and supported on a pair of spaced apart, variable diameter, sheaves which are independently movable between reduced and enlarged configurations and which result in the belt assuming different paths. A pair of rollers are rotatably mounted at fixedly spaced locations on an elongated carrier member. One of the rollers is actively biased into engagement with the drive belt by a compression spring assembly. A cam surface on the carrier member proximate the other of the rollers is slidable along a fixed supporting surface and passively assures engagement of the other of the rollers with the drive belt. As the ratio of the transmission changes with changed diameters of the sheaves and the drive belt thereby assumes a changed path, the drive belt is effective to automatically move the rollers therealong so as to maintain a substantially constant tension in the drive belt.

The present invention is of extremely simplified design, for the most part utilizes extremely strong, yet lightweight materials, most notably, plastics, and is easily assembled and maintained.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 5 is a side elevation view of a schematic representation of a transmission into which the self-adjusting belt tensioning system of the invention has been incorporated and illustrating two extreme configurations of the transmission;

FIG. 7 is a detail side elevation view of the invention, certain components being cut away and shown in section for clarity;

FIG. 7A is a detail side elevation view of a part of FIG. 7 illustrating another position of certain illustrated components;

FIG. 10 is a top plan view of certain components illustrated in FIGS. 6, 7, and 8;

FIG. 11 is a top plan view of one component, namely the casing, illustrated in FIGS. 6, 7, and 8;

FIG. 16 is a diagrammatic side elevation view of the transmission into which the invention has been incorporated, for purposes of explanation of the operation of the invention;

FIG. 17 is a detail diagrammatic side elevation view illustrating successive positions of the transmission drive belt and of the rollers which are part of the invention;

FIG. 19 is an exploded perspective view illustrating components of the modified drive belt tensioning system illustrated in FIG. 18;

FIG. 20 is a detail perspective view illustrating a part of one of the components depicted in FIG. 19;

FIG. 21 is a cross section view taken generally along line 21—21 of the component illustrated in FIG. 20 together with a part of another component;

FIG. 22 is a top plan view of the component illustrated in FIG. 20;

FIG. 23 is a detail side elevation view of parts illustrated in FIG. 18, depicting different positions of certain components therein;

FIG. 24 is a detail cross section view taken generally along line 24—24 in FIG. 18; and FIG. 25 is a detail cross section view taken generally along line 25—25 in FIG. 18.

DETAILED DESCRIPTION OF THE PREFERRED EMBODIMENTS

Figure 1:
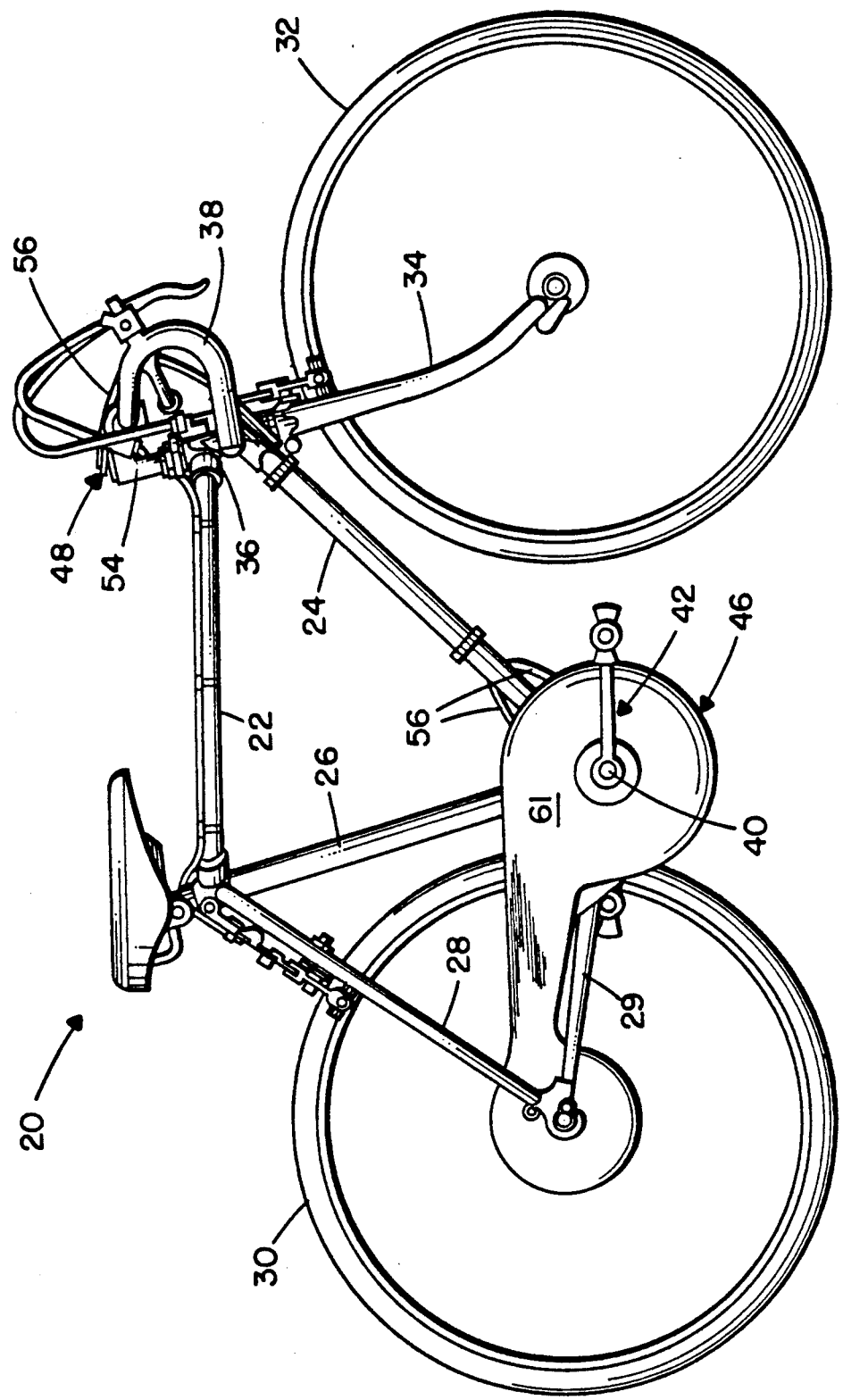
FIG. 1 is a right-side elevation of a bicycle equipped with a transmission utilizing a novel self adjusting drive belt tensioning system as an illustrative embodiment of the invention in its various aspects.

Refer now to the drawings, and initially to FIG. 1, which depict a bicycle 20 modified to incorporate a transmission utilizing the novel compensating mechanism of the invention. The bicycle is shown in FIG. as it is seen from its right-hand side (the right-hand side of the bicycle rider).

Figure 2:
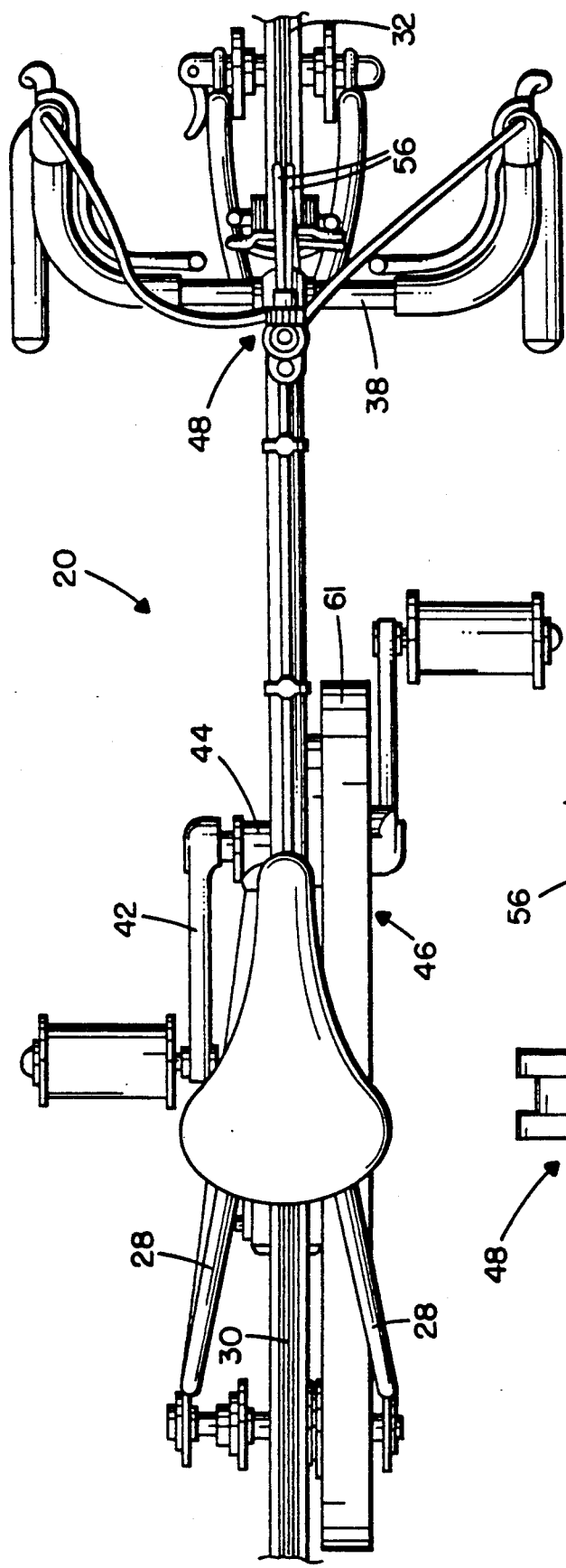
FIG. 2 is a top plan view of the bicycle of FIG. 1 drawn to larger scale, portions of the wheels being broken away.

The bicycle 20 may include a frame having a horizontal top tube 22, down tube 24 and seat tube 26 united as a triangle, plus two pairs of rear-wheel supports, one on each side of rear wheel 30 (FIGS. and 2), one pair being upright supports 28, the other pair being horizontal supports 29. The front wheel 32 is supported in a fork 34 that turns in head tube 36 which interconnects tubes 22 and 24. Handle bar 38 (FIGS. 1 and 2) operates the fork. Shaft 40 of a pedal crank 42 has a bearing 44 (FIG. 2) at the junction of down tube 24 and seat tube 26.

Figure 4:
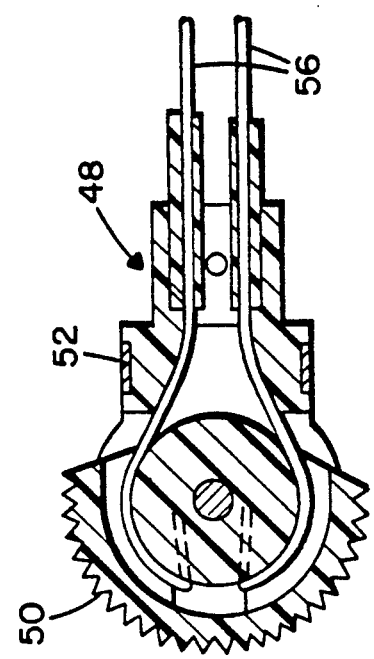
FIG. 4 is a cross-section of the finger control of FIG. 3 taken generally along line 4—4 in FIG. 3.
Figure 3:
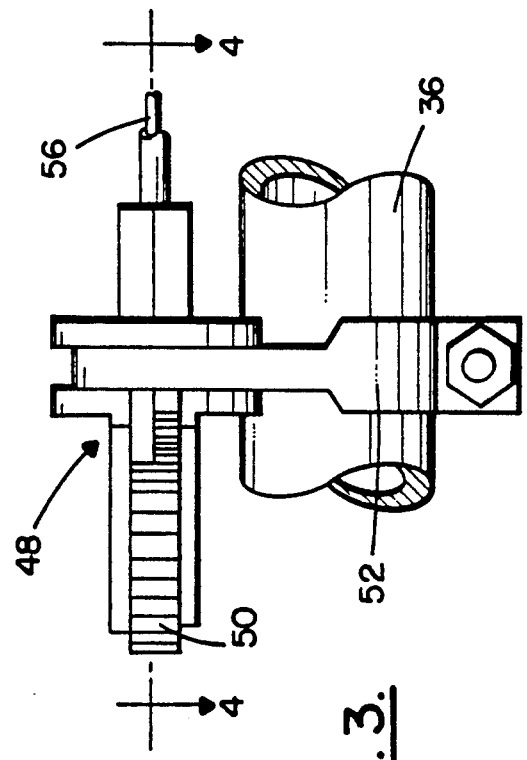
FIG. 3 is a side elevation view of a finger control shown in FIGS. 1 and 2, FIG. 3 being greatly enlarged as compared to FIGS. 1 and 2.

An adjustable ratio transmission unit or drive mechanism 46 provides the drive coupling between pedal crank 42 and rear wheel 30. A manual transmission ratio control 48 (see FIGS. 2, 3, and 4) includes a pivoted finger-actuated member 50 that is conveniently operable by the person riding the bicycle. A detailed description of this mechanism is presented in U.S. Pat. No. 4,816,008 referred to previously. Bracket 52 secures manual control 48 to a stem 54 upstanding from the head tube 36. The control also includes a pair of sheathed cables 56 operated by and extending to the transmission unit 46.

When the finger-actuated member 50 of the control 48 is centered (see FIG. 4), the last-established ratio remains in effect. Shifting the member 50 one way or the other has the effect of conditioning the transmission to change its own ratio in progressive steps using effort provided by the pedal crank. So long as the member 50 remains off center, continued operation of the pedals will cause, within the design limits, continuing step-by-step change in the transmission's ratio.

FIG. 5 depicts, schematically, the transmission 46 and most notably an drive belt 58 therefor in its lowest speed configuration by means of solid lines and in its highest speed configuration by means of dash-dot lines. The transmission 46 is supported in a housing 60 which may be sealed with the aid of a cover 61 against contaminants and constructed from modular parts to enable its use with virtually all signs of commercially available bicycles.

Figure 6:
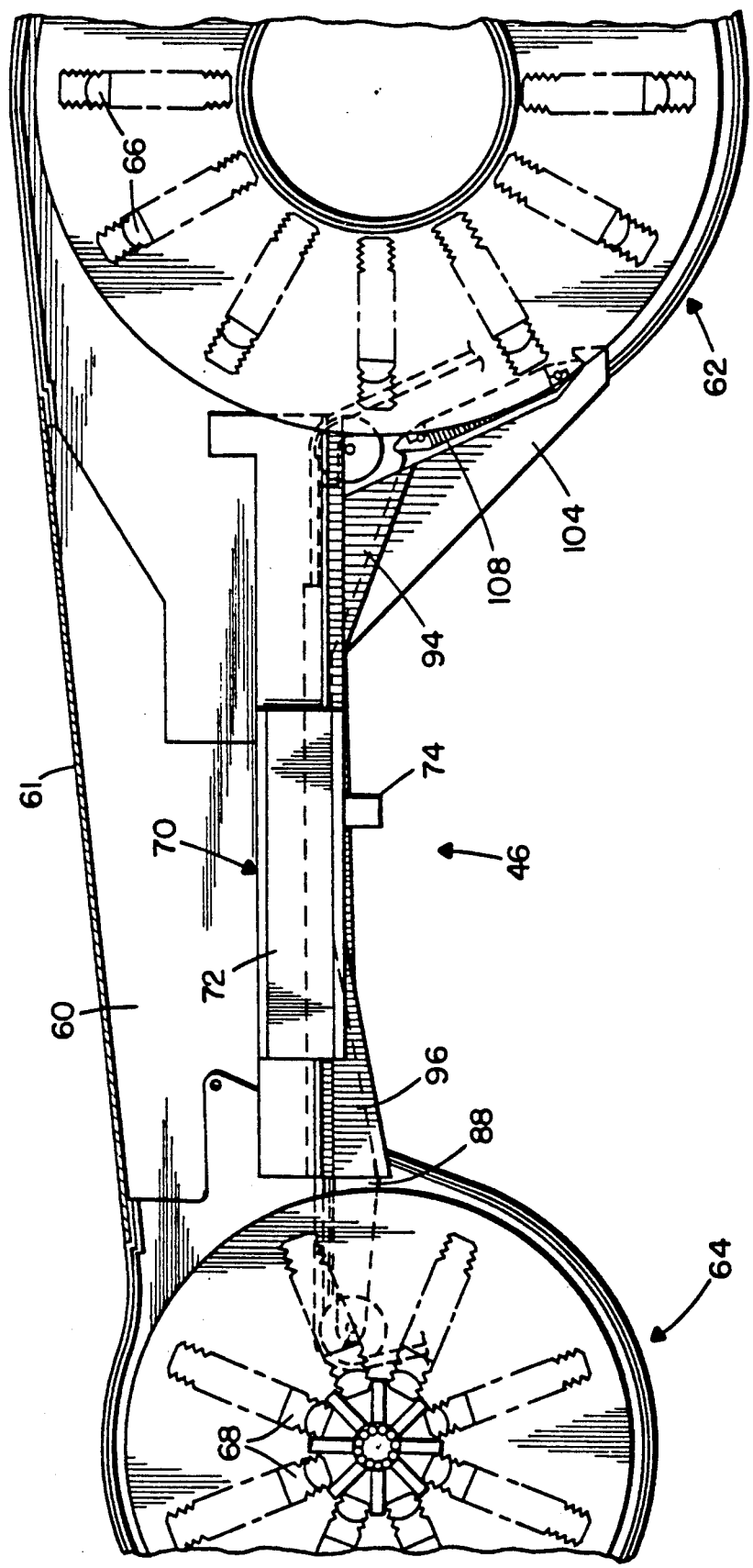
FIG. 6 is an enlarged detail side elevation view, certain parts being cut away, illustrating portions of a transmission incorporating the self adjusting drive belt tensioning system of the invention.

Viewing especially FIGS. 5 and 6, transmission 46 includes an adjustable front sheave mechanism 62 that is coaxial with and operated by pedal crank 42, and it includes a rear sheave mechanism 64 that operates the rear wheel. Sheave mechanism 62 includes a series of radially adjustable sheave segments 66 and sheave mechanism 64 includes a series of radially adjustable sheave segments 68. The endless drive belt 58 is in driving or driven frictional contact with the sheave segments of both sheave mechanisms 62 and 64 nearly all the way around each set of sheave segments. When a selected transmission ratio is in effect, sheave segments 66 are locked at one common radius and sheave segments 68 are also locked at a common radius.

As with all of the materials of which the transmission 46 is fabricated, the drive belt 58 is composed of an extremely strong, light weight material. For example, the belt may be four-ribbed, J section, poly-vee belt composed of KEVLAR ® brand plastic material with neoprene or polyurethane traction member thereon. Previous materials used for transmission belts included glass or polyester which, unfortunately, do not have the combined characteristics of rigidity and strength which are necessary in an application such as a transmission.

When sheave segments 66 are at their minimum-radius positions and sheave segments 68 are at their maximum-radius positions as depicted by the dash-dot line drive belt 58 in FIG. 5, the transmission is in its lowest speed adjustment. This means that the rear wheel will turn least for each rotation of the pedal crank. Conversely, when sheave segments 66 are at their largest-radius adjustment and sheave segments are at their smallest-radius positions, as depicted by the solid line drive belt 58 in FIG. 5, the transmission is set for most rotation of the rear wheel for each rotation of the pedal crank. The sizes and relationships thereof in FIG. 5 are only illustrative and are of no particular scale.

A coordinating mechanism which is not part of the present disclosure, although such a mechanism is fully disclosed in U.S. Pat. No. 4,816,008, previously noted, is provided for determining the radial settings of both sets of adjustable sheave segments. Both the front or pedal-driven sheave mechanism 62 and the rear sheave mechanism 64 are adjusted progressively in opposite directions in going through successive steps of adjustment. The coordinating mechanism causes the radius of one sheave mechanism to increase one step and, at the same time, it causes the radius of the other sheave mechanism to decrease one step. In an alternative, it is possible for the front sheave mechanism and back sheave mechanisms to be adjusted alternatively (not concurrently) in response to successive steps of adjustment of the coordinating mechanism.

Throughout the adjustment process, it is necessary that slack in the drive belt 58 be taken up and that, while doing so, tension in the drive belt be maintained at a substantially constant value. This desirable goal is achieved by a unique compensator 70 as generally depicted in FIGS. 6-8, and 10. In this context, an elongated casing 72 (see also FIGS. 11-15) is mounted to the frame of the bicycle, specifically, on the horizontal run 29 of the rear wheel support. As seen especially well in FIGS. 7 and 9, the casing 72 is provided with a centrally disposed, downwardly extending boss 74 which is drilled and tapped to receive a mating screw 76 for fastening thereto a clamp 78. The clamp serves to hold a rib 80 extending longitudinally along the bottom of the casing 72 firmly against the frame of the bicycle and, specifically, against the horizontal rear wheel support 29 The casing 72 thus extends fore and aft generally along a lower course of the drive belt 58 (see especially FIG. 7).

Figure 8:
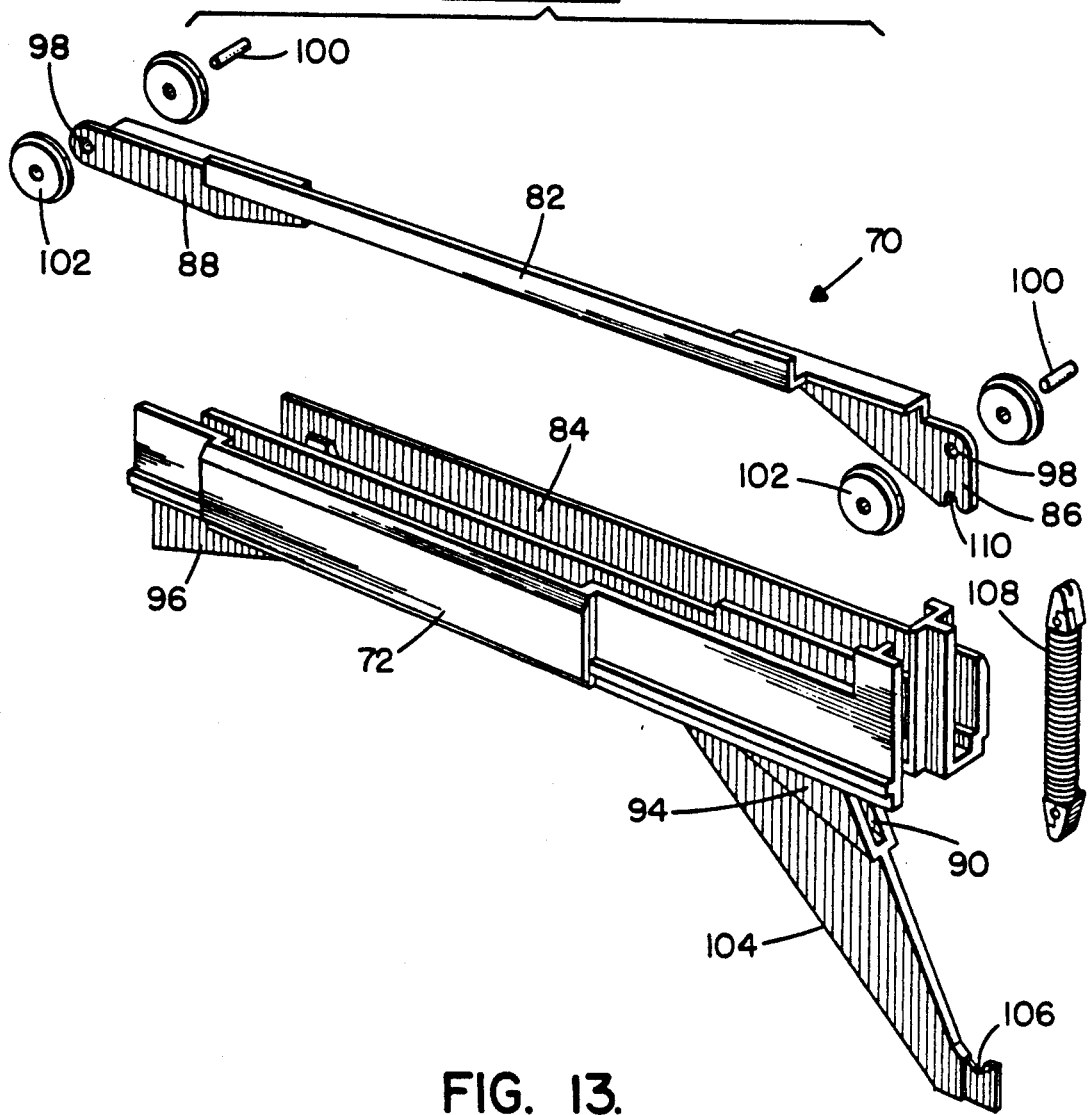
FIG. 8 is an exploded perspective view of the invention.
Figure 13:
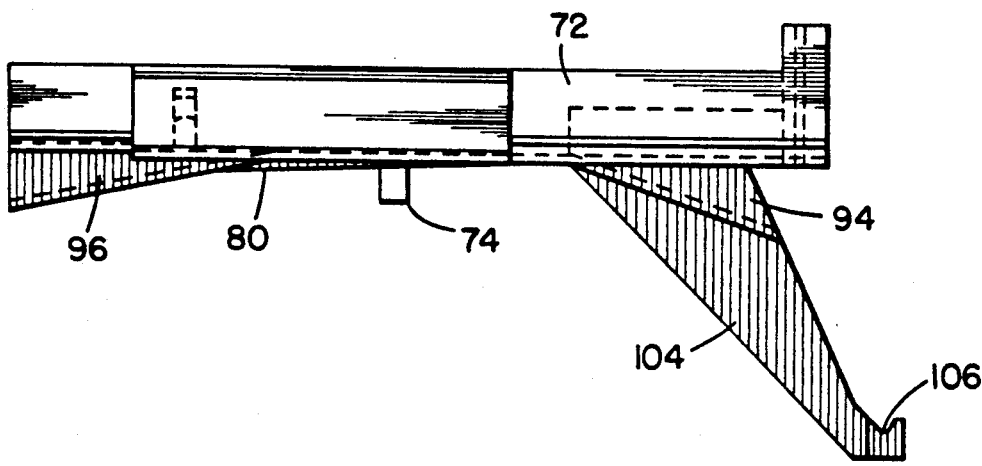
FIG. 13 is a side elevation view of the casing illustrated in FIGS. 11 and 12.
Figure 14:
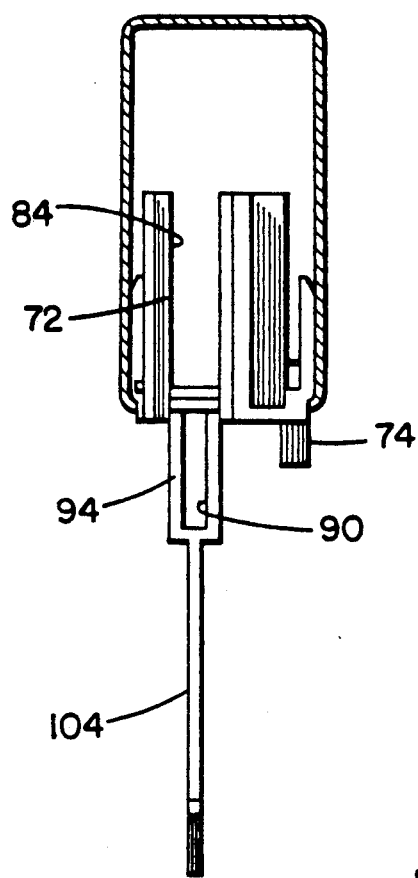
FIGS. 14 and 15 are end elevation views taken from opposite ends, respectively, of the casing illustrated in FIGS. 11-13.
Figure 15:
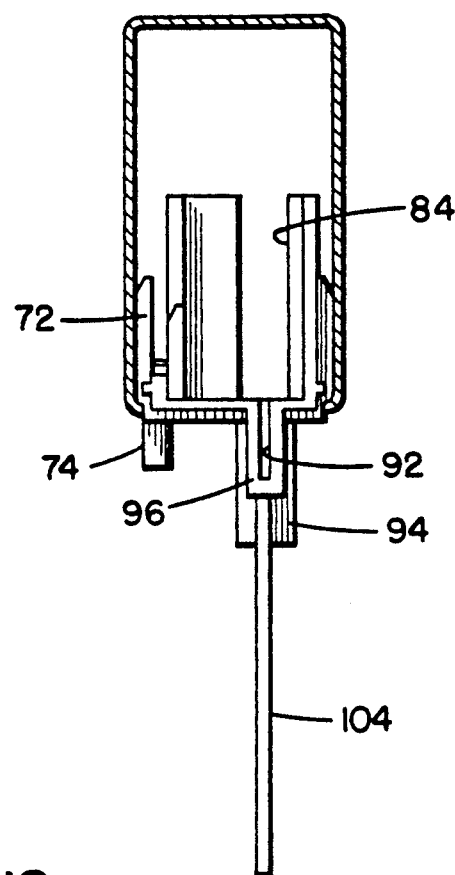
Figure 12:
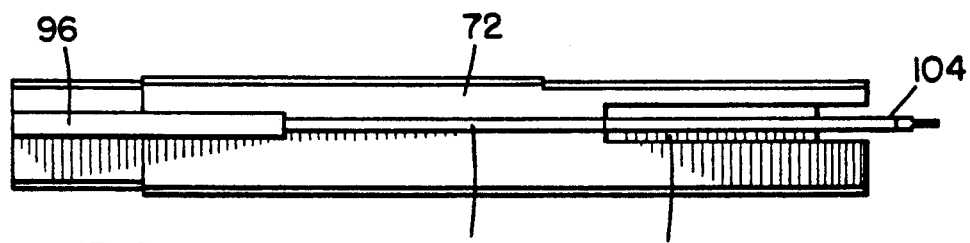
FIG. 12 is a bottom plan view of the casing illustrated in FIG. 11.
Figure 9:
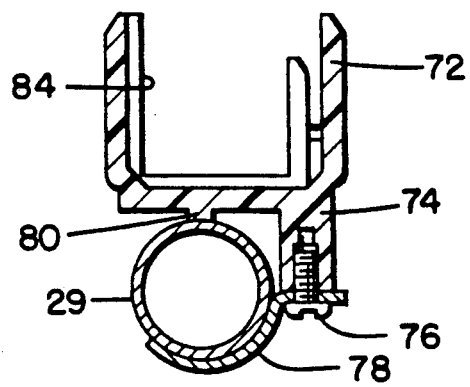
FIG. 9 is a cross section view taken generally along line 9—9 in FIG. 7.

A carrier 82 is generally coextensive with the casing 72 and is movable fore and aft relative to the casing within a channel 84 defined by opposed parallel walls. More specifically, the carrier 82 is formed with fore and aft fins, 86 and 88, respectively, which are slidingly engaged with mating fore and aft slots 90, 92, respectively, formed in downwardly projecting extensions 94 and 96 of the casing 72. Thus, while the carrier 82 is freely movable in a fore and aft direction relative to the casing 72, it is substantially restrained laterally by means of the slots 90, 92. Each of the fins 86, 88 is provided with a transverse hole 98 to rotatably receive an axle pin 100. Rollers 102 are fixed to opposed ends of the axle pins so as to be positioned on opposite sides of the fins 86 and 88 (FIGS. 8 and 10).

The rollers 102 are engageable with a lower course of the drive belt 58 but, as yet, there has been no description of the manner in which the rollers are maintained in engagement with the drive belt and, further, assures that a substantially constant tension is maintained in the drive belt.

To this end, a downwardly extending leg 104 extends from the fore projection 94. A bearing notch 106 is formed at an extremity of the leg 104 and serves to receive one end of a compression spring assembly 108 which may be generally of the construction disclosed in application Ser. No. 07/403,657 to which reference has previously been made. The opposite end of the compression spring assembly 108 is matingly received within a bearing notch 110 formed in the fore fin 86 of the carrier 82.

At an end of the compensator 70 distant from the compression spring assembly 108, the aft fin 88 of the carrier 82 is seen (see especially FIG. 7A) to have a well defined cam region 112 at the juncture of fin edges 114 and 116. Thus, as the carrier 82 moves toward the right from the position illustrated in FIG. 7 to that illustrated in FIG. 7A (also as illustrated in FIG. 7 by dashed lines), the cam region 112 is seen to engage and ride upon a cam surface 118 which is the bottom surface of the aft slot 92.

During this operation, then, the spring assembly 108 serves as an active bias on the rollers 102 at the forward end of the compensator 70 (to the right viewing FIG. 7) holding those rollers firmly in engagement with the drive belt 58. Such positive urging is not imparted to the rollers 102 at the aft end of the compensator 70, however. Rather, the tensioning of the drive belt 58 which occurs in the vicinity of the spring assembly 108 draws the drive belt into engagement with the rollers at the aft end of the carrier 82 By reason of the fact that the cam region 112 engages the cam surface 118, the rollers are passively caused to engage and remain in engagement with the drive belt.

The compensator 70 satisfies a number of potential problems inherent in belt drive mechanisms. For example, turning to FIG. 16, it will be recognized that a smaller diameter sheave mechanism, mechanism 64 as illustrated, shifts more rapidly than a larger sheave mechanism, mechanism 62 as illustrated. That is, during the shifting operation, the smaller sheave mechanism achieves its steady state condition faster or earlier than does the larger sheave mechanism. As the drive belt 58 moves from smaller orbit B to larger orbit A at the sheave mechanism 64, it oppositely moves from larger orbit B to smaller orbit A at the larger sheave mechanism 62. However, because of the time lapse of the actual shifting operation between the two sheave mechanisms, it will be appreciated that the sheave 62 does not "give up" a length of belt as fast as the sheave mechanism 64 is demanding it. This causes the rollers 102 adjacent the sheave mechanism 62 to momentarily (in mid-shift) assume another position such as that indicated at "A". When shifting has been completed and a steady state condition is again reached, the roller 102 adjacent the sheave mechanism 62 returns to position B. The letters "C" represent the opposite operation to that just described, namely, when the sheave mechanism 64 "gives up" belt faster than sheave mechanism 62 is able to receive it. In all of these instances, the compensator 70 is effective to instantaneously take up such slack in the drive belt as occurs and maintain a substantially constant tension in the belt.

FIG. 17 depicts extreme positions of the fore and aft rollers 102, the former being indicated by the letter "X," the latter being indicated by the letter "Y", and an intermediate position being indicated by dashed lines for different ratios of the sheave mechanisms 62 and 64 during steady state or non shifting conditions. It is important to maintain the axes of the rollers 102 adjacent the spring assembly 108 in a plane n, (FIG. 17) for each ratio of the sheave mechanisms. This relationship assures that the spring assembly 108 will maintain substantially constant tension on the drive belt 58 at all times. By utilizing the cam surface 118 contoured according to a plane Z (FIG. 17) which is the locus of axes for the rollers 102 nearest the sheave mechanism 64 as they move between positions X and Y, the fore rollers 102 maintain a near planar positioning requiring only minimal length adjustments for the spring 108 and thereby resulting in a nearly uniform resulting force being imposed by the spring on the drive belt 58.

Another benefit achieved by reason of the sloping cam surface 118 is the ability of the transmission 46 to assume a lowest possible path regardless of the transmission ratios chosen while clearing the horizontal rear wheel support 29 by an acceptable amount. Furthermore, it assures maximum wrap of the drive melt 58 at both the front sheave mechanism 62 and at the rear sheave mechanism 64.

One other consideration in the design of the present transmission is reducing or eliminating slippage between the belt and sheave segments. The movement, support and placement of compensator 70 in the transmission disclosed herein is of great importance in reaching this end. When force is applied to pedal crank 42 it will rotate sheave mechanism 62 along with sheave segments 66. Sheave segments 66, as they rotate, will place a force on belt 58 which transmits motion to sheave mechanism 64 through its segments 68. The amount of force that can be applied to the pedal crank without slippage of the belt relative to segments 66 can be expressed as a function of the tension forces applied to the belt on the "tight" and "slack" sides of sheave mechanism 62 by the pedal crank in accordance with the following formula:

$$T_2/T_1 = e^{fB}$$

wherein $T_2$ is the tension on the "tight" side of the belt (the upper belt run in FIG. 5 with forward pedalling); $T_1$ is the tension on the "slack" side of the belt (the lower belt in FIG. 5 with forward pedalling); e is the natural logarithm to the base e (log $T_2/T_1$) ; f is the coefficient of friction between the belt and sheave segments; and B is the total angle (in radians) of belt contact (or wrap) around the sheave segments As can be seen from the above formula, the ratio of $T_2/T_1$ depends on the extent of belt wrap in a given system, and, further, since belt wrap B is an exponential factor in the formula and multiplied by the coefficient of friction f, small incremental increases in the extent of belt wrap will generate exceedingly large increases in the amount of force that can be placed on the pedal crank before slippage or impending slippage occurs.

It can be appreciated, in the environment of the transmission disclosed herein, that a sufficient degree of belt wrap to reduce undesirable slippage has to be accomplished in a very small space adjacent the periphery of the sheaves, a space that also contains several other elements of the overall system. Further, the positions of the compensator has to accommodate many ratios, such as the 21 discrete ratios in the transmission as described in U.S. Pat. No. 4,816,008. To accomplish this, compensator 70 is supported for movement to obtain the degree of wrap desired. The structure provided herein by reason of which the compensator 70 is supported and moved enables the belt to have a larger amount of contact or wrap with the sheave segments 66 and 68 than the prior art for all selected ratios. It does so while still providing sufficient room for the other parts of the mechanism.

Figure 18:
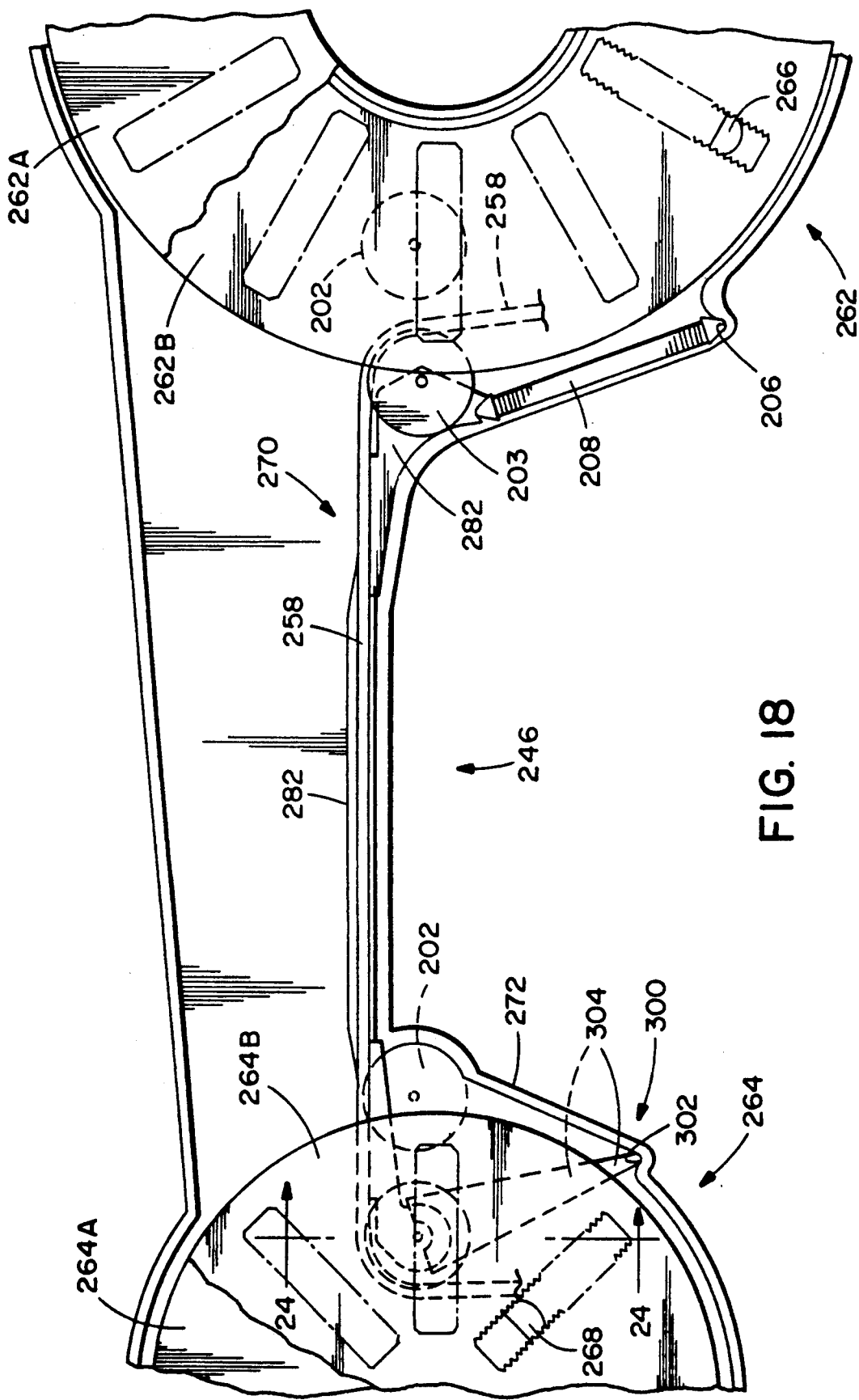
FIG. 18 is an enlarged detail side elevation view, similar to FIG. 6, certain parts being cut away, illustrating portions of a transmission incorporating a modified self adjusting drive belt tensioning system.

Turn now to FIGS. 18-24 which depict another embodiment of the invention. FIG. 18, as previously noted, is a view similar to FIG. 6. In a manner similar to the transmission 46 of FIG. 6, a transmission 246 in FIG. 18 includes an adjustable front sheave mechanism 262 that is coaxial with and operated by a pedal crank and it further includes a rear sheave mechanism 264 that operates the rear wheel. Sheave mechanism 262 includes a series of radially adjustable sheave segments 266 and sheave mechanism 264 includes a series of radially adjustable sheave segments 268. The front sheave mechanism 262 utilizes a pair of parallel, spaced apart coterminus disks 262A, 262B and, similarly, the rear sheave mechanism 264 utilizes a pair of parallel, spaced apart, coterminus disks 264A, 264B. the endless drive belt 258 is in driving or driven frictional contact with the sheave segments of both sheave mechanisms 262 and 264 nearly all the way around each set of sheave segments.

When a selected transmission ratio is in effect, sheave segments 266 are locked at one common radius and sheave segments 258 are similarly locked at a common radius. It was also previously explained with respect to the transmission 46, and is true with respect to the transmission 246, that it is necessary that the slack in the drive belt 258 be taken up and, that while doing so, tension in the drive belt be maintained at a substantially constant value. This desirable goal is achieved by the compensator 270 as generally depicted in FIG. 18. An elongated casing 272 is mounted to the frame of the bicycle in the manner depicted in FIG. 7 with respect to the earlier embodiment and serves to encapsulate all of the components described in connection with this present embodiment.

A carrier 282 (FIGS. 18, 19, and 23) is generally coextensive with the casing 272 and is movable fore and aft relative to the casing but in a manner somewhat different from that of the earlier embodiment. A more detailed explanation will be provided below. As with the carrier 82, the carrier 282 is formed with fore and aft fins, 286 and 288 (FIG. 19), respectively. Each of the fins 286, 288 is provided with a transverse hole 298 to rotatably receive the rollers 202. A pair of rollers 202 is positioned on opposite sides of the fins 286 and 288, respectively. The rollers 202 are engageable with a lower course of the drive belt 258. Each of the rollers 202 is centrally apertured as at 203 and each pair of rollers is mounted to the carrier 282 by means of a mating pair of hub caps 216, 218. As seen in FIG. 19 and more particularly in FIG. 25, each hub cap has an annular shoulder 216A, 218A, respectively, for rotational reception within the central aperture 203 of its associated roller 202. An axle pin 314 projects beyond the shoulder 216A, and interferingly extends through the transverse hole 298 in the fin 286, and is fittingly received in a central bore 316 of the hub cap 218. An identical construction is provided at the fin 288.

As seen in FIGS. 18 and 23, a bearing notch 206 is formed in the forward regions of the casing 272 and serves to receive one end of a compression spring assembly 208 which, again, may be generally of the construction disclosed in application Ser. No. 07/403,657 filed Sept. 6, 1989 to which reference has previously been made. The opposite end of the compression spring assembly 208 is matingly received within a bearing notch 210 formed in the fore fin 286 of the carrier 282.

At an end of the compensator 270 distant from the compression spring assembly 208, the aft fin 288 of the carrier 282 is seen (see especially FIGS. 19 and 21) to have a convex shaped journal bearing 212 which faces generally downwardly. This bearing 212 is an important part of a stabilizer mechanism 300 which serves to counteract rotational movement of the carrier 282 about its longitudinal axis. In FIGS. 18 and 23, the longitudinal axis of the carrier 282 is seen to be generally parallel to the course of the drive belt 258 against which the rollers 202 are engaged.

Other primary components of the stabilizer mechanism 300 include a bearing notch 302 suitably formed in the casing 272 and a pivot arm 304 which extends between the bearing notch 302 and the journal bearing 212 at the aft end 214 of the carrier 282. An apex 306 at a lowermost end of the pivot arm 304 is pivotably received in the bearing notch 302 of the casing 272. The uppermost end of the pivot arm 304 is recessed and provided with a concave journal bearing 308 shaped to matingly engage with the convex shaped journal bearing 212 at the aft end of the carrier 282. Additionally, left and right flanges 310, 312 defined by the recess which created the journal bearing 308 snugly engage the sidewalls of the aft end 214 of the carrier 282.

Viewing FIG. 23, as the carrier 282 moves forwardly, that is, toward the right from the position depicted by the dash lined pivot arm 304 toward the solid line position, the aft end 214, aft fin 288, and associated rollers 202 follow an arc having bearing notch 302 as its center, the convex journal bearing 212 being slidably engaged with the concave journal bearing 308. Throughout this movement, the carrier 282, the pivot arm 304, and the spring assembly 208 all remain substantially coplanar at all positions, and the rollers 202 remain substantially within the influence of the disks 262A, 262B, and 264A, 264B, respectively. As seen particularly well in FIG. 24, the rollers 202 at the rear of the transmission 246 are restrained against lateral movement by the disks 264A, 264B. Likewise, the rollers 202 at the forward region of the transmission 246 are restrained against lateral movement by the disks 262A, 262B. The lower apex of the pivot arm 304 is held both against lateral and longitudinal movement relative to the casing 272 and the lower end of the spring assembly 208 is likewise held against lateral and longitudinal movement relative to the casing. As a result, the rollers 202 remain squarely in engagement with the web of the drive belt 258 and, by reason of the length of the pivot arm 304, the carrier 282 is restrained from rotation about its longitudinal axis. Also, as the primary structural support for the compensator 270, the pivot arm 304 imparts stress directly to the casing 272 without any undesirably cantilevering force being exerted on the carrier 282.

While preferred embodiments of the invention have been disclosed in detail, it should be understood by those skilled in the art that various other modifications may be made to the illustrated embodiments without departing from the scope of the invention as described in the specification and defined in the appended claims. For example, while the invention has been disclosed in the context of a variable ratio transmission, it may also be advantageously applied to a conventional fixed ratio, fix center, belt transmission. In such an instance, the magnitude of the belt wraparound achieved by reason of the invention results in many of the previously mentioned advantages which accrued in the instance of the variable ratio transmission. Thus, a drive belt using the present invention can be used to achieve a greater output at less cost than any design previously known to me.

What is claimed is:

1. A self adjusting drive means tensioning system for a variably transmission comprising:

frame means;

a pair of spaced apart variable diameter sheaves mounted on said frame means;

endless drive means wrapped at least partially around each said sheave for transmitting rotational force from one said sheave to the other;

tensioning means for said drive means including a carrier and at least two spaced apart guides adjacent said drive means for placing force through said guides against said drive means whereby said guides maintain said drive means around said sheaves in optimum driving relationship for all diameters of said sheaves, said guides being supported by said frame means for movement in a non-rotational path as determined by the geometry of said drive means depending upon the diameters of said sheaves for any given ratio of the transmission whereby as the ratio of the transmission changes and said drive means achieves a new geometry in response to the changing diameters of said sheaves, said drive means automatically adjusts the position of said tensioning means;

means mounting said guides on said carrier, said carrier having a longitudinal axis substantially parallel with a line connecting said mounting means; and stabilizer means extending between said frame means and said carrier for counteracting rotational movement of said carrier about said longitudinal axis.

2. A tensioning system as set forth in claim 1
   wherein said support for said tensioning means is adjacent one of said guides, and, further including, bias means adjacent the other of said guides for biasing said other guide towards said drive means.

3. A tensioning system as set forth in claim 1
   wherein said carrier has an aft end adjacent one of said guides; and wherein said stabilizer means includes a pivot arm generally coplanar with said carrier, said pivot arm having a first end pivotally engaged with said frame means and a second end having a recess therein for snug but slidable reception of said aft end;

whereby upon unitary movement of said carrier and said pivot arm in their mutually defined plane, simultaneous rotation of said carrier about said longitudinal axis is inhibited.

4. A tensioning system for an endless drive means supported for movement by and at least partially wrapped around at least two sheaves supported by a frame comprising:

tensioning means including at least two spaced apart guide members for guiding the drive means and having a longitudinal axis generally parallel to the drive means;

support means for said tensioning means on said frame which is closer to one of said guide members than said other guide member;

biasing means for biasing said tensioning means towards said drive means which applies a force on said tensioning means and said drive means, the point of application of said biasing force being closer to said other of said guide members than said one guide member; and stabilizer means extending between the frame and said tensioning means for counteracting rotational movement of said tensioning means about said longitudinal axis.

5. Compensating apparatus continuously engageable with an endless belt being advanced by and supported on a pair of spaced apart sheave means which guide the belt along opposed courses, the sheave means being independently movable between reduced and enlarged configurations to thereby alter the path of the belt, said compensating apparatus comprising:

stationary elongated casing means extending fore and aft generally along one of the courses of the belt;

first and second spaced apart guide members at fixed distances apart and engageable with one of the courses of the belt;

carrier means generally coextensive with said casing means and movable fore and aft relative to said casing mans and including means mounting said guide members thereon, said carrier means having a longitudinal axis substantially parallel with a line connecting said mounting means;

means biasing said first guide member into engagement with the belt; and means distant from said biasing means for freely supporting said second guide member to assure passive engagement of the belt by said second guide member;

said guide members being movable in unison along the belt in response to the path taken by the belt thereby maintaining substantially constant the tension in the belt regardless of the path assumed by the belt; and stabilizer mans extending between said casing means and said carrier means for counteracting rotational movement of said carrier means about said longitudinal axis.

6. Compensating apparatus as set forth in claim 5 wherein said carrier means has an aft end adjacent one of said guide members; and wherein said stabilizer means includes a pivot arm generally coplanar with said carrier means, said pivot arm having a first end pivotally engaged with said casing means and a second end having a recess therein for snug but slidable reception of said aft end;

whereby upon unitary movement of said carrier means and said pivot arm in their mutually defined plane, simultaneous rotation of said carrier means about said longitudinal axis is inhibited.

7. Compensating apparatus as set forth in claim 6 wherein:

said biasing means includes compression spring means extending between said casing means and said carrier means; and said supporting means includes a supporting surface on said casing means distant from said biasing means; and said carrier means including a cam member engageable with said supporting surface and slidable along said supporting surface.

8. Compensating apparatus as set forth in claim 6 wherein said first and second guide members are rollers, said carrier means including means for rotatably mounting said rollers thereon.

9. Compensating apparatus as set forth in claim wherein said casing means includes a leg member extending to an extremity distant from one of the courses of the belt;

said compression spring means extending between said extremity and said carrier means.

10. Compensating apparatus continuously engageable with an endless belt being advanced by and supported on a pair of spaced apart sheave means which guide the belt along opposed courses, said compensating apparatus comprising:

stationary elongated casing means extending fore and aft generally along one of the courses of the belt;

carrier means;

first and second spaced apart guide members mounted on said carrier means at fixed distances apart and engageable with one of the courses of the belt;

means biasing said first guide member into engagement with the belt;

said carrier means having a longitudinal axis generally parallel to the course of the belt engaged by said first and second guide members;

means distant from said biasing means for freely supporting said second guide member to assure passive engagement of the belt by said second guide member;

said guide members being movable in unison along the belt in response to the path taken by the belt thereby maintaining substantially constant the tension in the belt regardless of the path assumed by the belt; and stabilizer means extending between said casing means and said carrier means for counteracting rotational movement of said carrier means about said longitudinal axis.

11. Compensating apparatus as set forth in claim 10 including means inhibiting lateral movement of said guide members.

12. Compensating apparatus continuously engageable with an endless belt being advanced by and supported on a pair of spaced apart sheave means which guide the belt along opposed courses, said compensating apparatus comprising:

an elongated carrier member;

first and second spaced apart guide roller mans engageable with one of the courses of the belt;

axle means rotatably mounting said guide roller means on said carrier member;

means biasing at least said first guide roller means into engagement with the belt;

said carrier member having a longitudinal axis generally parallel to the course of the belt engaged by said first and second guide roller means;

said first and second guide roller means being movable in unison along the belt in response to the path taken by the belt thereby maintaining substantially constant the tension in the belt regardless of the path assumed by the belt; and stabilizer mans for counteracting rotational movement of said carrier member about said longitudinal axis.

13. Compensating apparatus as set forth in claim 12 including means inhibiting lateral movement of said guide members.

14. Compensating apparatus as set forth in claim 12 wherein said axle means include first and second axle pins extending transverse of and rotatably mounted on said carrier member, said first and second axle pins lying in a plane substantially parallel to a plane of the web of the belt; and wherein said first and second guide roller means include, respectively, left and right rollers fixed on said first and second axle pins on opposite sides of said carrier member.

15. Compensating apparatus as set forth in claim 14 including stationary elongated casing means extending fore and aft generally along one of the courses of the belt; and wherein said carrier member has an aft end adjacent one of said guides; and wherein said stabilizer means includes a pivot arm generally coplanar with aid carrier, and generally perpendicular to the plane of said first and second axle pins and having a first end pivotally engaged with said casing means and a second end having a recess therein for snug but slidable reception of said aft end;

whereby upon unitary movement of said carrier member and said pivot arm in their mutually defined plane, simultaneous rotation of said carrier about said longitudinal axis is inhibited.

* * * * *